United States Patent
Yachida (10) Patent No.: US 8,254,464 B2
(45) Date of Patent: Aug. 28, 2012

(54) IMAGE QUALITY ESTIMATION APPARATUS AND IMAGE QUALITY ESTIMATION METHOD

(75) Inventor: Shoji Yachida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/003,844

(22) PCT Filed: Jan. 14, 2010

(86) PCT No.: PCT/JP2010/050309
§ 371 (c)(1),
(2), (4) Date: Jan. 12, 2011

(87) PCT Pub. No.: WO2010/092848
PCT Pub. Date: Aug. 19, 2010

(65) Prior Publication Data
US 2011/0289540 A1 Nov. 24, 2011

(30) Foreign Application Priority Data
Feb. 10, 2009 (JP) ................................ 2009-028599

(51) Int. Cl.
*H04N 7/18* (2006.01)
(52) U.S. Cl. .................... 375/240.25; 375/240.27
(58) Field of Classification Search . 375/240.01–240.29
See application file for complete search history.

(56) References Cited

U.S. PATENT DOCUMENTS 5,457,701 A * 10/1995 Wasilewski et al. .......... 714/776
7,925,961 B2 * 4/2011 Huang .......................... 714/774

FOREIGN PATENT DOCUMENTS

| JP | 2007306109 | 11/2007 |
| JP | 2008005108 A | 1/2008 |
| JP | 2008527896 A | 7/2008 |
| JP | 2008211579 A | 9/2008 |
| JP | 2008211587 | 9/2008 |

OTHER PUBLICATIONS

International Search Report for PCT/JP2010/050309 mailed Apr. 20, 2010.
K. Ushiki et al., "Verification of Picture Type Estimation Method using TS Header Information—Toward Establishment of Objective Packet-layer Video Quality Assessment Model-", IEICE Technical Report, The Institute of Electronics, Information and Communication Engineers, CO2007-74, 2007, pp. 15-19.

* cited by examiner

Primary Examiner — Andy Rao

(57) ABSTRACT

An image quality estimation apparatus is provided that solves the problem of the need for a large-capacity memory. An FEC packet analysis unit (3) verifies the continuity of FEC packets. An error information table generation unit (4) verifies the continuity of image packets. An estimation unit estimates, as uncorrectable data, image data that are contained in image packets that are missing and for which error correction by FEC data is not possible. The estimation unit estimates image quality of the image data based on the uncorrectable data.

7 Claims, 8 Drawing Sheets

| RTP sequence number | RTP packet existence |
|---|---|
| n-2 | present |
| n-1 | present |
| n | present |
| n+1 | absent |
| n+2 | present |
| ... | |
| n+i | present |
| ... | |
| n+2(D+L)-3 | present |
| n+2(D+L)-2 | present |
| n+2(D+L)-1 [n+199] | present |

20 error information table

| RTP sequence number | RTP packet existence | FEC packet existence | video packet existence | video packet continuity | video packet importance |
|---|---|---|---|---|---|
| n-2 | present | absent | present | absent | absent |
| n-1 | present | absent | present | present | present |
| n | present | present | present | present | absent |
| n+1 | absent | absent | absent | absent | absent |
| n+2 | present | absent | present | absent | absent |
| ... | | | | | |
| n+i | present | absent | present | present | absent |
| ... | | | | | |
| n+2(D+L)-3 | present | absent | present | present | absent |
| n+2(D+L)-2 | present | absent | present | present | absent |
| n+2(D+L)-1 [n+199] | present | absent | absent | present | absent |

20 error information table

Fig.9

| video frame number | video packet loss existence | FEC packet recovery existence | picture type | video data code amount | video data average code amount |
|---|---|---|---|---|---|
| n-2 | absent | absent | B | Σ(n-2) | Ave Σ(n-2) |
| n-1 | absent | absent | B | Σ(n-1) | Ave Σ(n-1) |
| n | present | present | I | Σ(n) | Ave Σ(n-1) |
| n+1 | absent | absent | B | Σ(n+1) | Ave Σ(n+1) |
| n+2 | present | absent | P | Σ(n+2) | Ave Σ(n+1) |
| n+3 | absent | absent | B | Σ(n+3) | Ave Σ(n+3) |
| n+4 | absent | absent | B | Σ(n+4) | Ave Σ(n+4) |
| n+5 | absent | absent | P | Σ(n+5) | Ave Σ(n+5) |
| ... | ... | ... | ... | ... | ... |
| n+i | absent | absent | P | Σ(n+i) | Ave Σ(n+i) |
| n+i+1 | absent | absent | B | Σ(n+i+1) | Ave Σ(n+i+1) |

31 32 33 34 35 36

20 image information tabl

IMAGE QUALITY ESTIMATION APPARATUS AND IMAGE QUALITY ESTIMATION METHOD

This application is the National Phase of PCT/JP2010/050309, filed Jan. 14, 2010, which claims priority based on Japanese Patent Application No. 2009-28599 for which application was submitted on Feb. 10, 2009 and incorporates all of the disclosures of that application.

TECHNICAL FIELD

The present invention relates to an image quality estimation apparatus, an image quality estimation method, and a program for monitoring the quality of image data, and more particularly relates to an image quality estimation apparatus and image quality estimation method for monitoring the quality of image data that are distributed in an IPTV service.

BACKGROUND ART

Terrestrial analog broadcasting will end in Japan in 2011. It is therefore hoped that by 2011 terrestrial analog broadcasting will have transitioned smoothly to terrestrial digital broadcasting and that terrestrial digital broadcasting coverage to areas that can view terrestrial analog broadcasting will have reached 100%. An IPTV (Internet Protocol Television) service (terrestrial digital IP rebroadcasting service) that uses an NGN (Next Generation Network) network as an IP network has been proposed as a means for meeting these demands. An IPTV service is a form of service for distributing digital TV broadcasting by way of an IP network.

A typical network is of the Best-Effort type that does not guarantee QoS (Quality of Service), and the quality of image data that are distributed to image viewers in an image distribution service therefore cannot necessarily be guaranteed. QoS is guaranteed when an NGN network is used, and image quality equivalent to that of a broadcast TV service that uses electromagnetic waves can therefore be guaranteed.

In a broadcast TV service that uses electromagnetic waves, the area in which the broadcast can be viewed is computed based on the strength of electromagnetic waves that are transmitted from the transmission station and buildings or topography. Tests of image quality are carried out at several observation points within the area in which viewing is possible, and the image quality is monitored by comparing the test results with the results of computing the theoretical image quality.

In contrast, in an IPTV service, there is a plurality of providers from the transmission of content until the reception in the TV receiver of each residence. As a result, image quality must be monitored between each of the providers.

Figure 1:
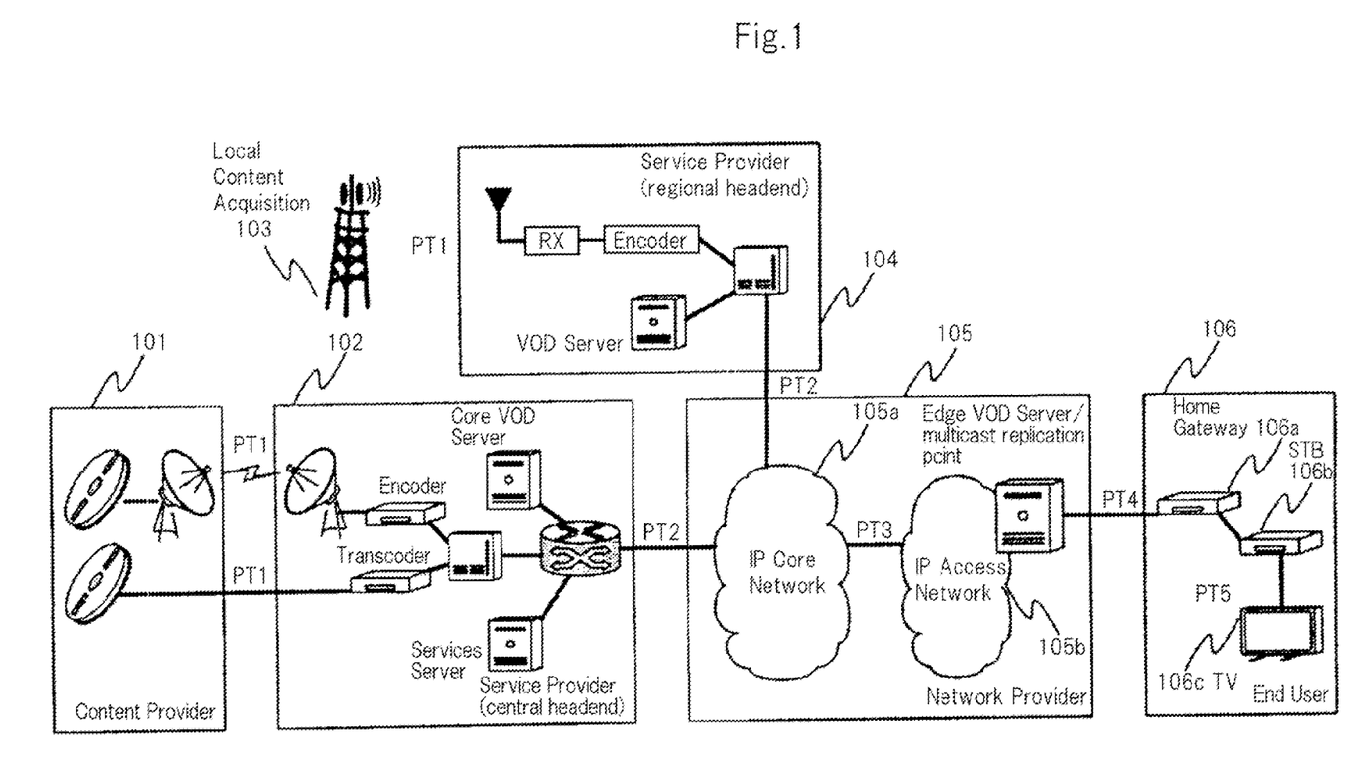
FIG. 1 is an explanatory view showing monitor points in ITU-T recommendations in the related art.

For example, it is established in the ITU-T recommendations that five monitor points for monitoring image quality are to be provided. FIG. 1 is an explanatory view showing the monitor points in the ITU-T recommendation. Monitor points PT1-PT5 are shown in FIG. 1.

As shown in FIG. 1, a communication system for providing an IPTV service includes: content provider 101, service provider (central headend) 102, local content acquisition 103, service provider (regional headend) 104, network provider 105, and end user 106.

Image data are distributed to end user 106 by way of a path composed of content provider 101, service provider 102, and network provider 105 or by way of a path composed of local content acquisition 103, service provider 104, and network provider 105.

Monitor point PT1 is provided between content provider 101 and service provider 102 or between local content acquisition 103 and service provider 104. Monitor point PT2 is provided between service provider 102 and IP core network 105a within network provider 105, or between service provider 104 and IP core network 105a.

Monitor point PT3 is provided between IP core network 105a and IP access network 105b within network provider 105. Monitor point PT4 is provided between VOD (Video on Demand) server (Edge VOD Server/multicast replication point) 105c on IP access network 105b and the gateway (Home Gateway) 106a of end user 106. Monitor point PT5 is provided between STB (Set-top box) 106b of end user 106 and TV 106c of end user 106.

Figure 2:
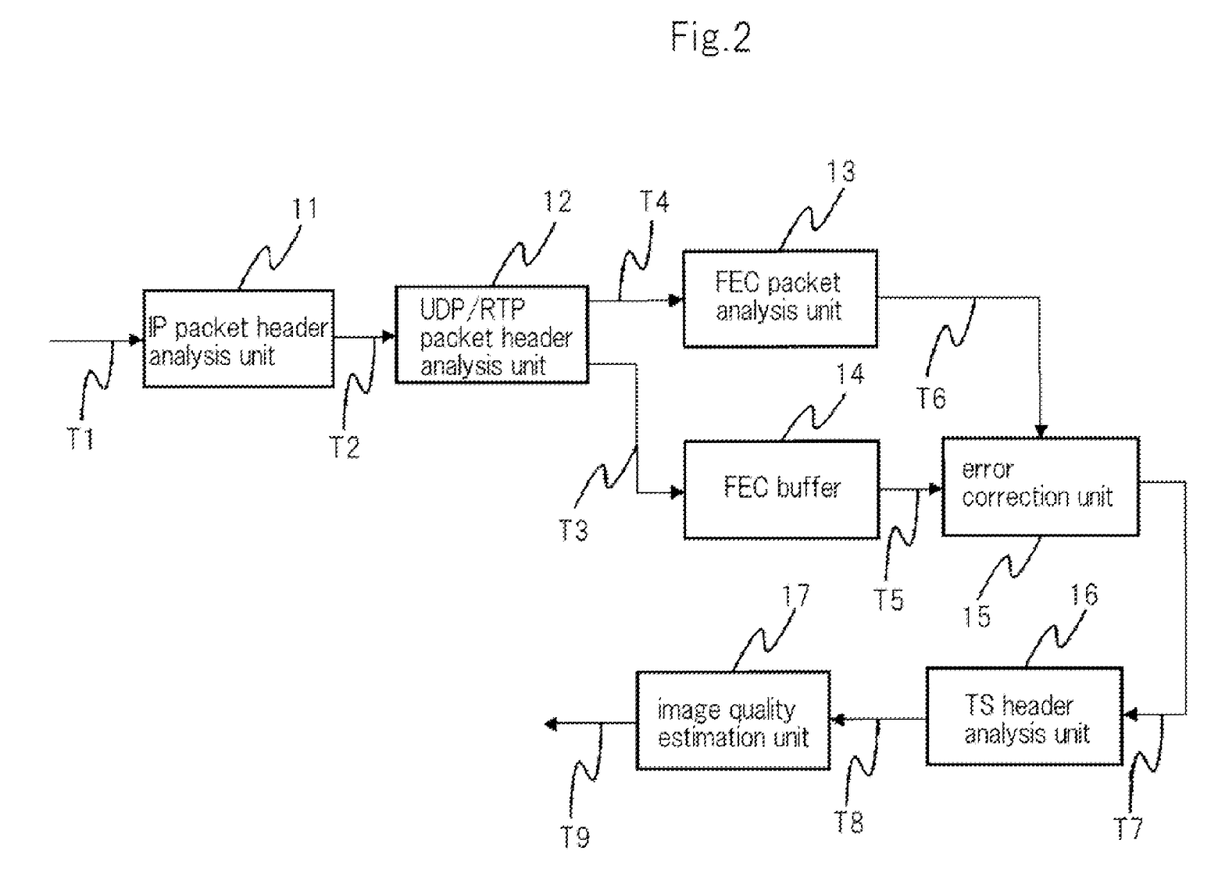
FIG. 2 is a block diagram showing the configuration of an image quality monitoring apparatus of the related art.

The following explanation regards the method of monitoring image quality that is implemented at monitor points PT3 and PT4. FIG. 2 is a block diagram showing the configuration of an image quality monitoring apparatus for realizing this monitoring method.

IP packet header analysis unit 11 extracts packets for monitoring image quality from IP packets T1 that are transferred over a network (not shown) and supplies the extracted packets as IP packets T2. For example, when IP packets T1 are data that have been converted to IP multicast packets, IP packet header analysis unit 11 extracts IP packets T1 that have a predetermined multicast address.

UDP/RTP packet header analysis unit 12 separates IP packets T2 into TS packets T3 and FEC (Forward Error Correction) packets T4 based on the destination port numbers of the UDP packet headers in IP packets T2. TS packets T3 are data in which a plurality of TS packets that are image data are converted to RTP, and FEC packets T4 are data in which FEC data for implementing error correction of the image data have been converted to RTP packets.

Of the plurality of TS packets within TS packets T3, FEC packet analysis unit 13 analyzes the headers (TS packet headers) of TS packets for which error correction by FEC packets T4 is possible and supplies the TS packet headers and FEC packets T4 as FEC data T6.

FEC buffer 14 reorders each of TS packets within TS packets T3 in the correct order based on time information within RTP packet headers of TS packets T3. FEC buffer 14 delays TS packets T3 in which the TS packets have been reordered until a timing at which error correction by FEC data T6 is possible and supplies the delayed TS packets T3 as TS packets T5.

Error correction unit 15 carries out error correction of TS packets T5 based on FEC data T6 and supplies TS packets T5 that have undergone error correction as TS packets T7.

TS header analysis unit 16 extracts image packets T8 in which image data have been converted to packets from TS packets T7.

Image quality estimation unit 17 uses the image coding parameters and image packet headers of image packets T8 to estimate the image quality of the image data and supplies image quality estimation information T9 that indicates the image quality.

The technology for realizing this type of monitoring method is an image quality estimation apparatus disclosed in Patent Document 1.

LITERATURE OF THE PRIOR ART

Patent Documents

Patent Document 1: JP-A-2008-005108

SUMMARY OF THE INVENTION

Problem to be Solved by the Invention

In the above-described monitoring method, TS packets for carrying out error correction of image data must be delayed to a timing at which error correction by FEC data becomes possible. In addition, the inclusion of image data in the TS packets results in a voluminous amount of data.

Accordingly, the above-described monitoring method has the disadvantage of necessitating memory of large capacity for delaying the TS packets.

It is therefore an object of the present invention to provide an image quality estimation apparatus, image quality estimation method, and a program that can provide a solution to the above-described problem, i.e., the need for a large-capacity memory.

Means for Solving the Problem

The image quality estimation apparatus according to the present invention includes: input means that receives image packets in which image data have been converted to packets and correction packets in which correction data for correcting errors of the image data are converted to packets; first verification means that verifies the continuity of image packets received by the input means; second verification means that verifies the continuity of correction packets received by the input means; and estimation means that, based on each of the continuities that were verified in the first verification means and the second verification means, estimates, as uncorrectable data, image data that are contained in missing image packets and for which error correction by the correction data is not possible and estimates the image quality of the image data based on the uncorrectable data that was estimated.

The image quality estimation method according to the present invention is realized by an image quality estimation apparatus and includes: an input step of receiving image packets in which image data are converted to packets and correction packets in which correction data for correcting errors of the image data are converted to packets; a first verification step of verifying the continuity of the image packets that were received; a second verification step of verifying the continuity of the correction packets that were received; and an estimation step of, based on each of the continuities that were verified, estimating, as uncorrectable data, image data that are contained in missing image packets and for which correction by the correction data is not possible and estimating the image quality of the image data based on the uncorrectable data that were estimated.

The recording medium according to the present invention is a recording medium on which is recorded a program for causing a computer to execute: a procedure of receiving image packets in which image data are converted to packets and correction packets in which correction data for correcting errors of the image data are converted to packets; a procedure of verifying the continuity of the image packets that were received; a procedure of verifying the continuity of the correction packets that were received; and a procedure of, based on each of the continuities that were verified, estimating as uncorrectable data, image data that are contained in image packets that are missing and for which error correction by the correction data is not possible, and estimating the image quality of the image data based on the uncorrectable data that were estimated.

Effect of the Invention

Due to the present invention, a large-capacity memory need not be used.

CARRYING OUT THE INVENTION

An exemplary embodiment of the present invention is next described with reference to the accompanying drawings.

Figure 3:
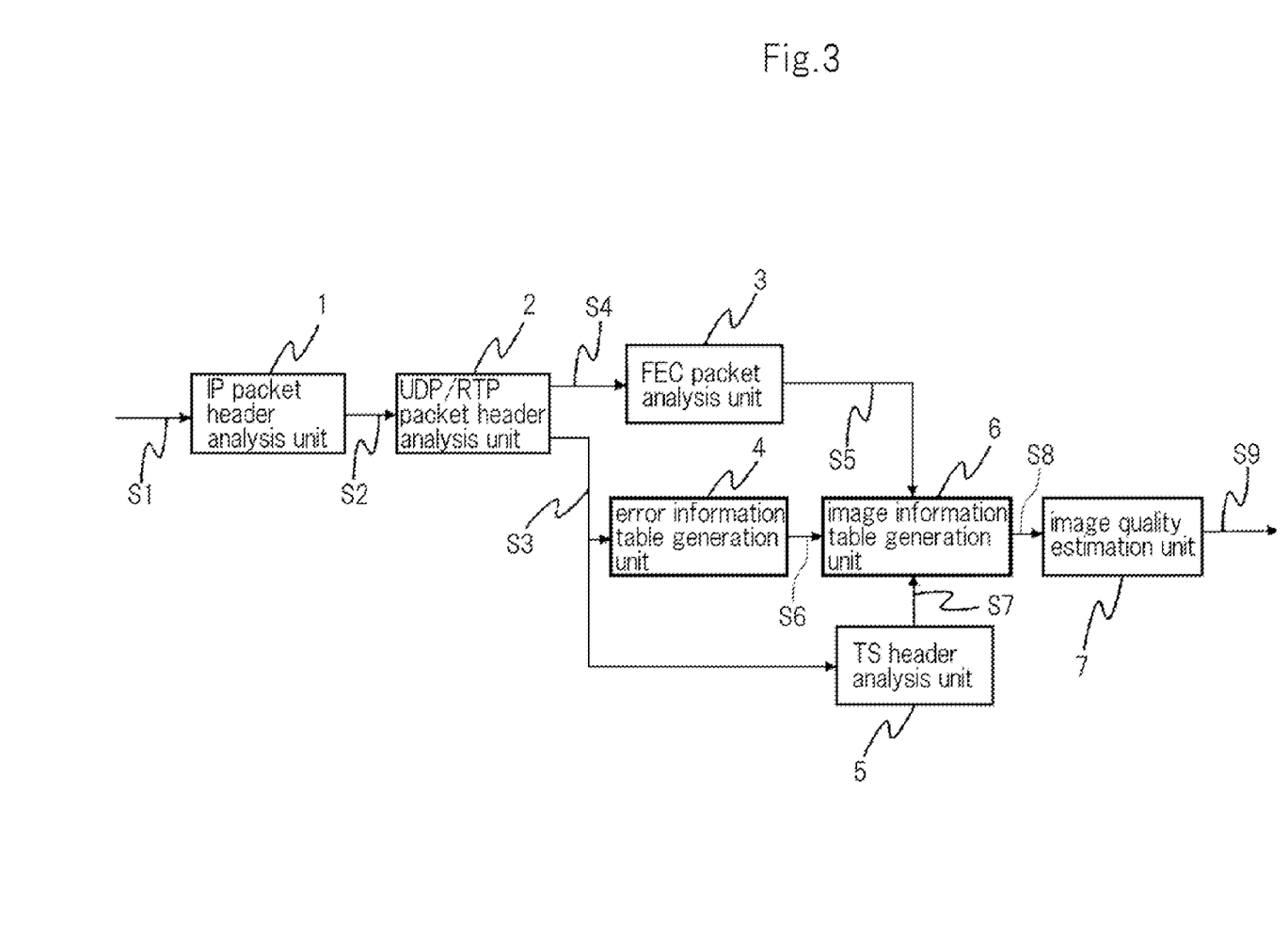
FIG. 3 is a block diagram showing the configuration of an image quality estimation apparatus of an exemplary embodiment of the present invention.

FIG. 3 is a block diagram showing the configuration of the image quality estimation apparatus of an exemplary embodiment of the present invention.

The image quality estimation apparatus is a device that estimates the image quality of image data that are distributed in an IPTV broadcasting service that uses IP multicast. In this case, image data are compression-coded and converted to packets, and IP multicast is a technology for using an IP network to transmit image data that have been compression-coded in real time.

The image quality estimation apparatus can be applied to, for example, the estimation of not only the image quality of image data that are distributed in an IPTV broadcasting service but also the image quality of image data that are distributed in a real-time VoD (Video on Demand) service that uses IP datacast or a download service for allowing viewing after downloading TV service data.

In FIG. 3, the image quality estimation apparatus includes: an input unit that includes IP packet header analysis unit 1 and UDP/RTP packet header analysis unit 2; and an estimation unit that includes FEC packet analysis unit 3, error information table generation unit 4, TS header analysis unit 5, image information table generation unit 6, and image quality estimation unit 7.

IP packet header analysis unit 1 of the input unit receives packet data S1 that are transmitted by IP multicast on a network (not shown).

Packet data S1 includes image packets realized by converting image data to IP packets and FEC packets realized by converting FEC data to RTP packets. The FEC data are correction data for correcting errors of the image data. The FEC packets are an example of correction packets. The FEC packets are further cyclically inserted between image packets.

In the present exemplary embodiment, the image data are assumed to be compression-coded in an MPEG2-TS format. In this case, the image data include a video stream that indicates an image and information other than the video stream such as an audio stream that indicates speech.

Image data are packetized in PES (Packetized Elementary Stream) packets for each picture (frame). Each PES packet is divided into a plurality of TS packets. One or a plurality of TS packets is stored in one RTP packet (UDP/RTP packet). Image packets are constructed by further converting RTP packets to IP packets.

Figure 4:
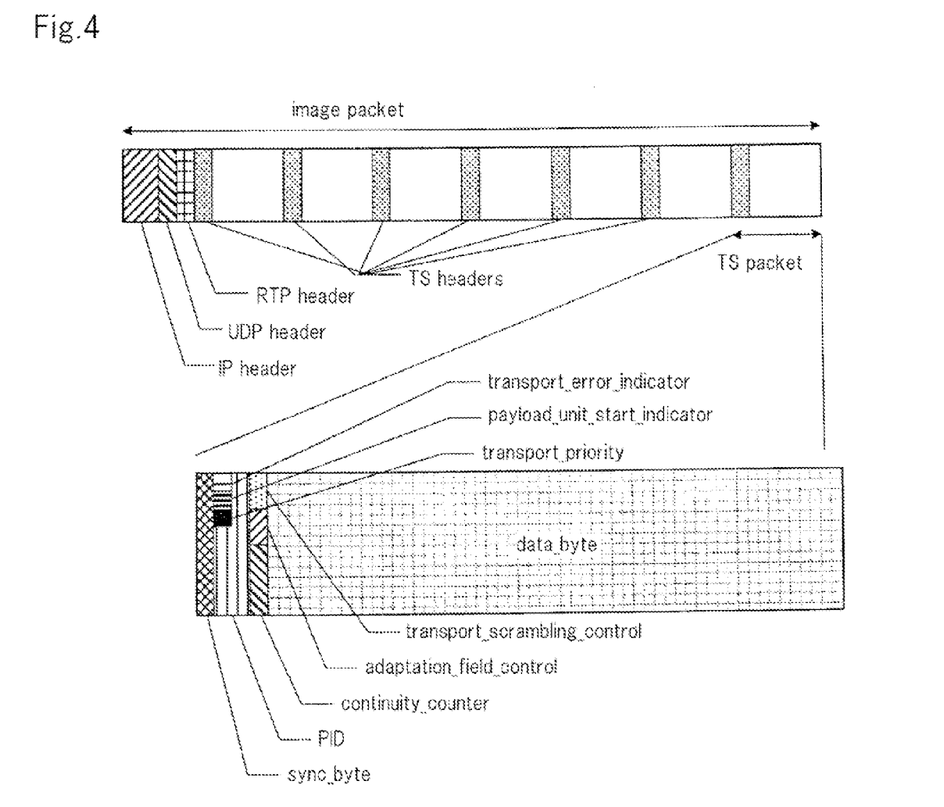
FIG. 4 is an explanatory view showing an example of the configuration of an image packet.

FIG. 4 is an explanatory view showing an example of the composition of an image packet.

As shown in FIG. 4, each TS packet that is contained in an image packet includes a TS header and a data region (data_byte) that has a payload.

A TS header includes a synchronizing byte (sync_byte), a transport error flag (transport_error_indicator), a PES packet start flag (payload_unit_start_indicator), a priority flag (transport_priority), a PID (Packet Identifier), a scramble flag (transport_scrambling_control), an adaptation field control flag (adaptation_field_control), and a continuity counter value (continuity_counter).

The synchronizing byte indicates the start of a TS packet. The transport error flag indicates whether there is an error in the TS packet.

The PES packet start flag indicates whether the payload contained in the data region starts from the start of the PES packet. More specifically, when "1," the PES packet start flag indicates that the payload begins from the start of the PES packet, and when "0," indicates that the payload does not begin from the start of the PES packet.

The priority flag indicates whether the TS packet is important, and more specifically, when "1," the priority flag indicates that the TS packet is important, and when "0," indicates that the TS packet is not important.

The PID indicates the type of TS packet. The scramble flag indicates whether the TS packet is scrambled (encrypted).

The adaptation field control flag indicates whether an adaptation field of variable length exists in the TS packet, and specifically, when "1," the adaptation field control flag indicates that an adaptation field is present, and when "0," indicates that there is no adaptation field.

An adaptation field contains an elementary stream priority flag that indicates whether an elementary stream, which is an image or speech that has been encrypted, is important, when "1," the elementary stream priority flag indicates that the elementary stream is important, and when "0," indicates that the elementary stream is not important.

The continuity counter value indicates the order of the TS packet.

In addition, time-stamp information (TTS (Time-stamped TS) time-stamp information) may further be added to a TS packet. It is assumed hereinbelow that TS packets are TTS packets to which this TTS time-stamp information has been added.

An RTP packet further includes a UDP header, an RTP header, and a plurality of TS packets. An image packet is an IP packet, and includes an IP header and an RTP packet.

Figure 5:
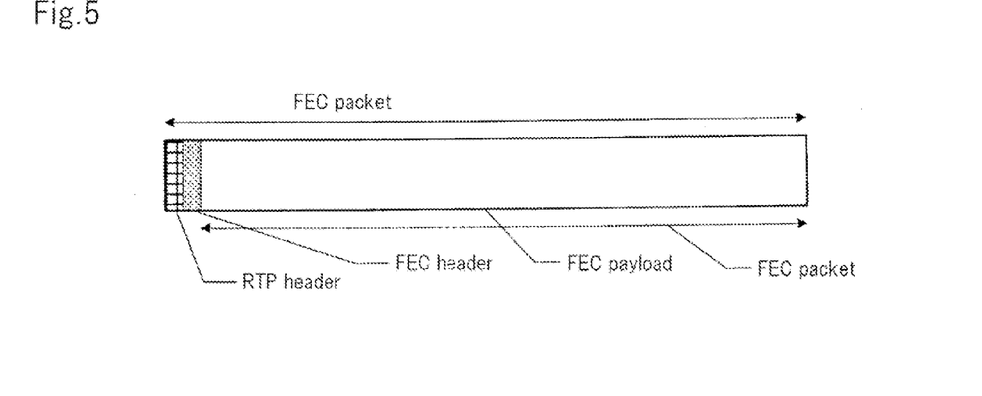
FIG. 5 is an explanatory view showing an example of the configuration of an FEC packet.

Returning to the explanation of FIG. 3, an FEC packet includes an RTP header, an FEC header, and an FEC payload, as shown in FIG. 5.

The FEC payload includes FEC data. The FEC header contains an RTP sequence number (SN base) of the start of the RTP packet that is the object of error correction by the FEC packet that has the FEC header and the effective length (length recovery) that is the length of the RTP packet that is the object of error correction by the FEC packet. This leading RTP sequence number is referred to as the leading RTP sequence number.

Returning to the explanation of FIG. 3, IP packet header analysis unit 1 extracts from packet data S1, as packet data S2, packets for estimating the image quality and FEC packets for correcting errors of these packets.

UDP/RTP packet header analysis unit 2 separates packet data S2 that were extracted in JP packet header analysis unit 1 into image packets and FEC packets. UDP/RTP packet header analysis unit 2 generates RTP packets within image packets as RTP packets S3 and generates FEC packets as FEC packets S4.

FEC packet analysis unit 3 is an example of the first verification means. FEC packet analysis unit 3 verifies the continuity of FEC packets S4 that were generated by UDP/RTP packet header analysis unit 2 and generates FEC continuity information that indicates the continuity of FEC packets S4. In the FEC continuity information, FEC existence information that indicates whether there are FEC packets is placed in correspondence with RTP sequence numbers. The FEC existence information indicates that FEC packets exist when "present" and indicates that there are no FEC packets when "absent."

FEC packet analysis unit 3 generates FEC packet information S5 that includes FEC continuity information. When the FEC existence information is "present" at this time, FEC packets S4 exist that include the RTP sequence numbers that correspond to the FEC existence information, and FEC packet analysis unit 3 therefore adds the FEC headers of these FEC packets S4 to FEC packet information S5.

Error information table generation unit 4 is an example of the second verification means. Error information table generation unit 4 verifies the continuity of RTP packets S3 and generates error information table S6 that indicates this continuity. In error information table S6, RTP existence information that indicates whether RTP packets S3 exist or not is stored for each RTP sequence number.

The RTP existence information indicates that RTP packets exist when "present" and indicates that RTP packets do not exist when "absent."

Figure 6:
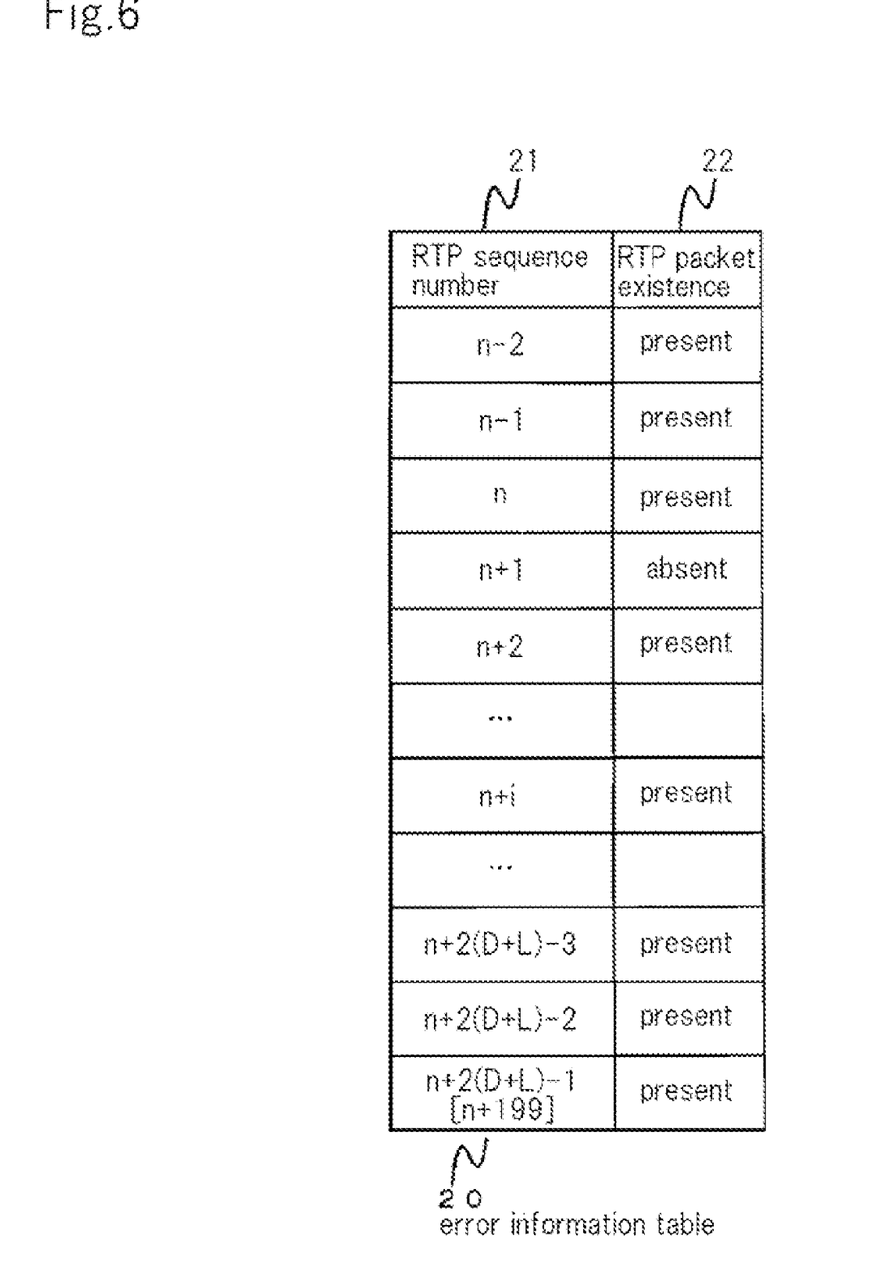
FIG. 6 is an explanatory view showing an example of an error information table.

FIG. 6 is an explanatory view showing an example of an error information table. In error correction by means of FEC data, the information length D is assumed to be 5 and the code length L is assumed to be 20. In this case, the RTP sequence number in the error information table should be at least 200.

Error information table 20 includes RTP sequence number 21 and RTP packet existence 22. RTP packet existence 22 is RTP existence information, and indicates whether RTP packets exist that include RTP sequence number 21.

Returning to the explanation of FIG. 3, based on FEC packet information S5 that was generated by FEC packet analysis unit 3 and error information table S6 that was generated by error information table generation unit 4, the estimation unit that includes TS header analysis unit 5, image information table generation unit 6, and image quality estimation unit 7 estimates uncorrectable data that are contained in image packets that are missing due to, for example, the occurrence of packet loss. The estimation unit estimates the image quality of the image data based on this uncorrectable data. In addition, the uncorrectable data are image data for which error correction by the FEC data was not possible.

More specifically, TS header analysis unit 5, image information table generation unit 6, and image quality estimation unit 7 carry out the processes described hereinbelow.

TS header analysis unit 5 analyzes the TS headers of RTP packets that were generated by UDP/RTP packet header analysis unit 2 to detect each picture code amount and importance contained in RTP packets S3 and generates the results of this detection as TS header information S7.

Based on FEC packet information S5 and error information table S6, image information table generation unit 6 estimates the uncorrectable packets for which error correction by the FEC packets is not possible among the missing image packets.

Based on TS header information S7, image information table generation unit 6 estimates each picture code amount and picture type contained in image packets that are not missing. Based on the picture code amount and picture type that were estimated, image information table generation unit 6 estimates the picture type and number of uncorrectable data that are contained in the uncorrectable packets and generates the estimation results as image information table S8.

Based on image information table S8 that was generated by image information table generation unit 6, image quality estimation unit 7 estimates the image quality of the image data and supplies the estimation results as image quality S9.

Explanation next relates to operations.

Figure 7:
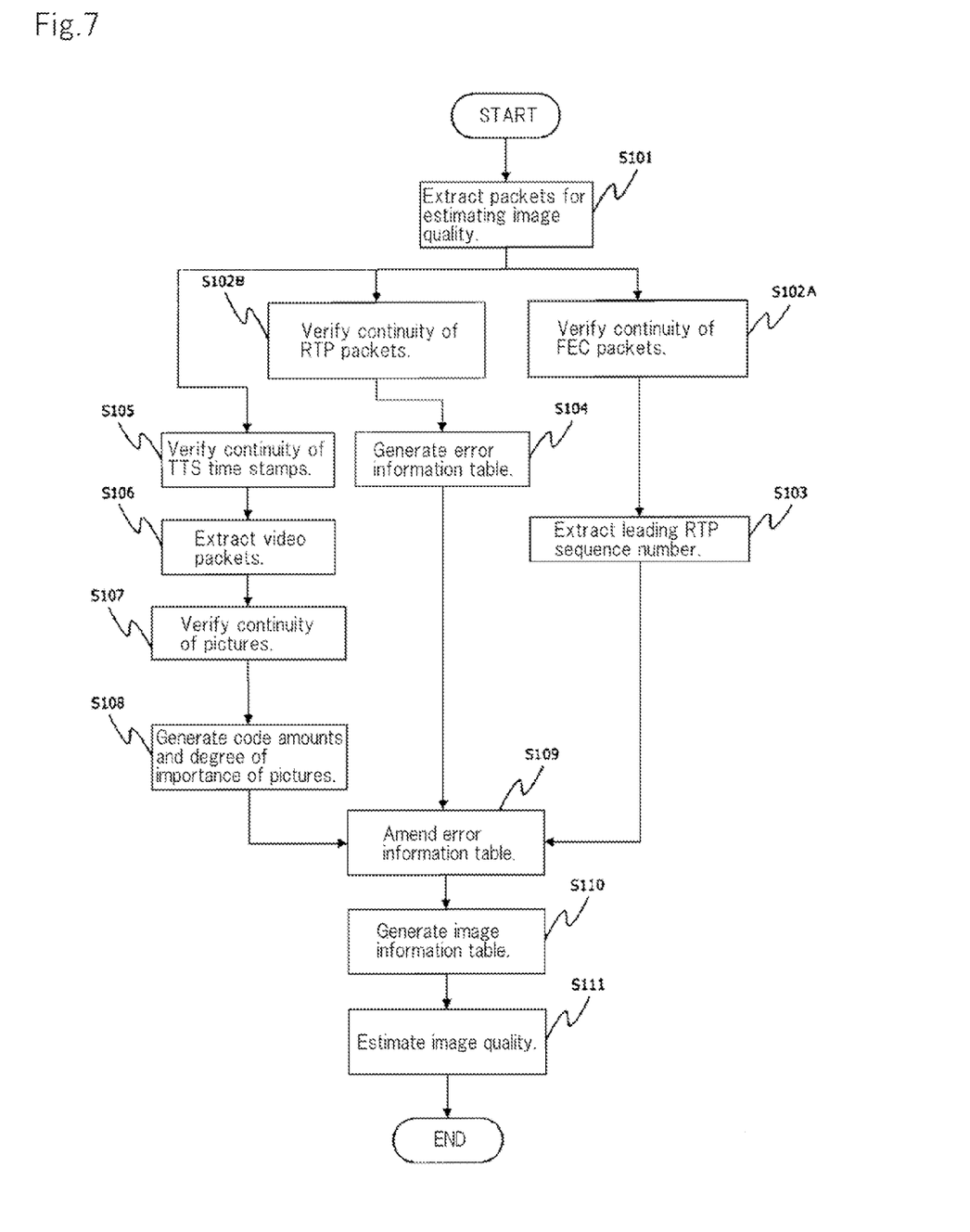
FIG. 7 is a flow chart for explaining the operations of an image quality estimation apparatus.

FIG. 7 is a flow chart for describing the operations of the image quality estimation apparatus.

Upon receiving packet data S1, IP packet header analysis unit 1 executes Step S101.

In Step S101, IP packet header analysis unit 1 extracts data for estimating image quality from packet data S1 as packet data S2 based on at least one of IP headers and UDP headers of packet data S1.

For example, IP packet header analysis unit 1 holds the multicast addresses of IPTV service data for estimating image quality, and when a multicast address in an IP header is identical to a multicast address that is being held, extracts the IPTV service data as packet data S2.

IP packet header analysis unit 1 applies packet data S2 as input to UDP/RTP packet header analysis unit 2.

UDP/RTP packet header analysis unit 2 separates packet data S2 into image packets and FEC packets.

For example, UDP/RTP packet header analysis unit 2 first checks the port numbers (transmission origin port number and transmission destination port number) contained in the UDP header. UDP/RTP packet header analysis unit 2 then takes packet data S2 as image packets if the port numbers that were checked are values for transmitting image data, and takes packet data S2 as FEC packets if the checked port numbers are values for transmitting FEC data.

UDP/RTP packet header analysis unit 2 applies RTP packets in the image packets as RTP packets S3 to error information table generation unit 4 and TS header analysis unit 5. Alternatively, UDP/RTP packet header analysis unit 2 applies FEC packets as FEC packets S4 to FEC packet analysis unit 3.

Upon receiving FEC packets S4, FEC packet analysis unit 3 executes Step S102A. Alternatively, upon receiving RTP packets S3, error information table generation unit 4 executes Step S102B. Further, upon receiving RTP packets S3, TS header analysis unit 5 executes Step S105.

In Step S102A, FEC packet analysis unit 3 verifies the continuity of FEC packets S4 and generates FEC continuity information indicating the continuity.

The RTP sequence number is a 16-bit integer without code and is data to which "1" is added each time a packet is transmitted in the same service. As a result, FEC packets S4 are continuous if the RTP sequence numbers are continuous, and FEC packets S4 are discontinuous if the RTP sequence numbers are discontinuous. FEC packet analysis unit 3 is thus able to verify the continuity of the RIP sequence numbers as the continuity of FEC packets S4.

More specifically, each time FEC packets S4 are received as input, FEC packet analysis unit 3 computes the difference between the current RTP sequence number in the FEC packet S4 and the preceding RTP sequence number in the previously received FEC packet S4.

When this difference is "1," FEC packet analysis unit 3 determines that FEC packets S4 are continuous and generates FEC continuity information in which FEC existence information indicating "present" is placed in correspondence with the current RTP sequence number.

On the other hand, when this difference is not "1," FEC packet analysis unit 3 determines that FEC packets S4 are not continuous and finds the number of FEC packets S4 that are missing according to the difference. If the difference is "n," the number of missing FEC packets S4 is "n−1."

FEC packet analysis unit 3 finds the missing RTP sequence numbers in the missing FEC packets S4 based on the number of missing FEC packets S4 and the previous RTP sequence number. FEC packet analysis unit 3 places FEC existence information that indicates "absent" in correspondence with each of the missing RTP sequence numbers that were found and generates FEC continuity information of the number of the FEC packets S4 that are missing. FEC packet analysis unit 3 further places FEC existence information that indicates "present" in correspondence with the current RTP sequence number and generates FEC continuity information.

Nevertheless, when the occurrence of a burst error results in a continuous loss of 16 bits or more in RTP sequence numbers, the number of missing FEC packets S4 cannot be specified by the RTP sequence numbers alone. As a result, FEC packet analysis unit 3 may determine the number of missing FEC packets based on time-stamp information.

More specifically, FEC packet analysis unit 3 first, with each input of FEC packets S4, finds the difference Δ between the time indicated by the time-stamp information in the FEC packet S4 and the time indicated by the time-stamp information in FEC packet S4 received as the preceding input. FEC packet analysis unit 3 further computes the cumulative average ΔM of the differences. FEC packet analysis unit 3 then determines whether difference Δ surpasses a predetermined multiple of cumulative average ΔM.

When difference Δ is less than the predetermined multiple of cumulative average ΔM, FEC packet analysis unit 3 determines that a burst error has not occurred and carries out verification of the continuity using the RTP sequence numbers.

However, when difference Δ equals or exceeds the predetermined multiple of cumulative average ΔM, FEC packet analysis unit 3 determines that a burst error has occurred and finds the number of FEC packets S4 that are missing according to the difference Δ.

The predetermined number is preferably, for example, 65536 at which the RTP sequence number comes full circle. However, the predetermined number is not limited to this number and need only be a number that allows determination of the occurrence of packet loss (for example, 8000).

FEC packet analysis unit 3, upon generating FEC continuity information, generates FEC packet information S5 that includes this FEC continuity information. FEC packet analysis unit 3 applies this FEC packet information S5 to image information table generation unit 6. Upon receiving the FEC packet information S5 input, image information table generation unit 6 executes Step S103.

In Step S103, image information table generation unit 6 extracts the leading RTP sequence number from the FEC header if a FEC header is included in FEC packet information S5. Image information table generation unit 6 then executes Step S109.

Error information table generation unit 4 further verifies the continuity of RTP packets S3 in Step S102B. The method of verifying the continuity of RTP packets S3 is identical to the method of verifying the continuity of FEC packets S4 by FEC packet analysis unit 3 and a detailed explanation is therefore here omitted. Upon verifying continuity, error information table generation unit 4 executes Step S104.

In Step S104, error information table generation unit 4 generates error information table S6 that indicates the continuity and applies error information table S6 that was generated to image information table generation unit 6 as input. Image information table generation unit 6 then executes Step S109.

In Step S105, TS header analysis unit 5 verifies the continuity of TTS time-stamp information that is contained in RTP packets S3.

The TTS time-stamp information is time information of four bytes that uses a video reference clock (90 kHz). In addition, because TS packets are transmitted at a fixed rate in the MPEG2-TS format, difference time Δ TTS, which is the difference between the TTS time-stamp information in a particular TS packet and the TTS time-stamp information in the next TS packet, is fixed if there is no packet loss in the TS packets.

TS header analysis unit 5 then finds, for each TS packet, the difference between the TTS time-stamp information in that TS packet and the TTS time-stamp information in the preceding TS packet and determines whether the difference diverges from a fixed value.

TS header analysis unit 5 determines that TS packets are discontinuous when the difference diverges from a fixed value and determines that the TS packets are continuous when the difference does not diverge from a fixed value. TS header analysis unit 5 estimates the number of missing test packets from the width of divergence between the difference and a fixed value.

Upon verifying the continuity of the TTS time-stamp information, TS header analysis unit 5 executes Step S106.

In Step S106, TS header analysis unit 5 checks whether video packets, which are TS packets that contain a video stream, are present in RTP packets S3.

When video packets are present in RTP packets S3, TS header analysis unit 5 extracts the video packets from RTP packets S3. When there is a plurality of TS packets in RTP packets S3, TS header analysis unit 5 separates the video packets into TS packet units.

Upon completion of Step S106, TS header analysis unit 5 executes Step S107.

In Step S107, TS header analysis unit 5 verifies the continuity of the video packets. The method of verifying the continuity of video packets is identical to the method of verifying the continuity of FEC packets S4 by FEC packet analysis unit 3 and detailed explanation is therefore here omitted. In the method of verifying continuity of video packets, the continuity of continuity counter values contained in the TS headers in the video packets is verified in place of the continuity of RTP sequence numbers as the continuity of the video packets. Upon the occurrence of a burst error, the continuity of the TTS time-stamp information is used to find the number of missing video packets.

Upon verifying the continuity of video packets, TS header analysis unit 5 executes Step S108.

In Step S108, TS header analysis unit 5 identifies for each picture the video packets that have that picture.

More specifically, TS header analysis unit 5 proceeds by checking the PES packet start flag contained in the TS header in each video packet and by identifying as video packets having the same picture those video packets from the video packet in which the PES packet start flag is "1" up to one video packet before the video packet in which the next PES packet start flag is "1."

Upon identifying video packets that have the picture, TS header analysis unit 5 finds the degree of importance of the picture.

More specifically, TS header analysis unit 5 first extracts the priority flag and adaptation field control flag from the TS header of each video packet that has the picture.

Next, when the adaptation field control flag is "1," TS header analysis unit 5 extracts a PCR (program clock reference) and elementary stream priority flag from the adaptation field that is contained in the data region in the video packet. Although clock information of the image data is inserted into the PCR, this point is omitted from the following explanation because it is not directly related to the present invention.

When there is a flag that indicates "1" among the extracted priority flag and elementary stream priority flag, TS header analysis unit 5 determines the picture as important. On the other hand, when there is no flag that indicates "1" among the extracted priority flag and elementary stream priority flag, TS header analysis unit 5 determines the picture as unimportant.

Upon finding the importance of the picture, TS header analysis unit 5 finds the code amount of the video packets that have the picture as the code amount of the picture.

TS header analysis unit 5 generates, for each picture, picture information in which the picture code amount and importance and video continuity information that indicates whether video packets that have that picture are continuous or not are placed in correspondence with the video frame number in the video packets that have the picture. The video frame number indicates the order of display of the pictures.

TS header analysis unit 5 places this picture information in correspondence with RTP sequence numbers that are contained in RTP packets S3 to generate TS header information S7. TS header analysis unit 5 applies the TS header information as input to image information table generation unit 6. Upon receiving the TS header information, image information table generation unit 6 executes Step S109.

In Step S109, image information table generation unit 6 amends the error information table based on the leading sequence number that was extracted in Step S103 and TS header information S7.

More specifically, image information table generation unit 6 first places FEC existence information that indicates "present" in correspondence with the RTP sequence numbers that are the same as leading RTP sequence numbers in error information table S6 and places FEC existence information that indicates "absent" in correspondence with RTP sequence numbers that differ from the leading RTP sequence numbers.

Image information table generation unit 6 next confers, to each of RTP sequence numbers in error information table S6, picture existence information, video continuity information, and picture importance that are contained in the picture information that was placed in correspondence with the RTP sequence numbers in TS header information S7.

Figure 8:
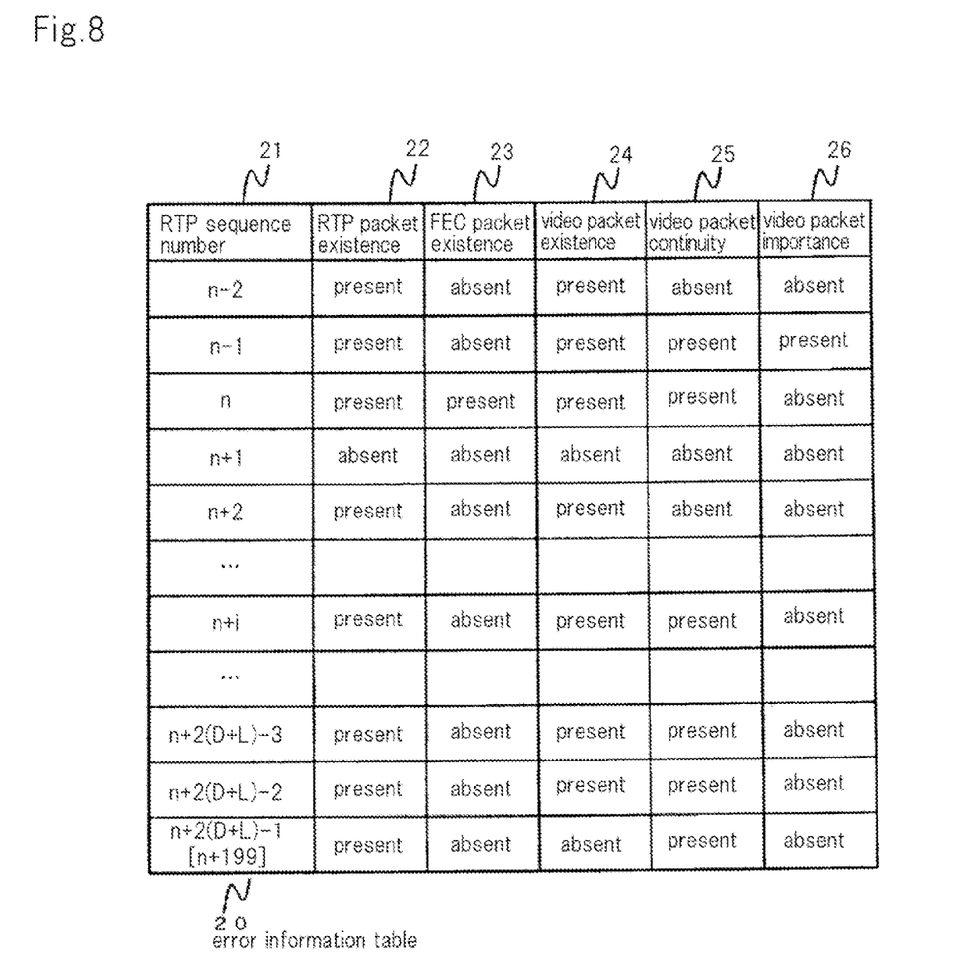
FIG. 8 is an explanatory view showing another example of an error information table.

FIG. 8 is an explanatory view showing an example of error information table S6 following amendment. In FIG. 8, information that is identical to FIG. 6 is given the same reference numbers. In addition, in FIG. 8, information length D is 5 and code length L is 20, as in FIG. 6.

In FIG. 8, error information table 20 includes: RTP sequence number 21, RTP packet existence 22, FEC packet existence 23, video packet existence 24, video packet continuity 25, and video packet importance 26.

FEC packet existence 23 is FEC packet information and indicates whether an FEC packet exists that has RTP sequence number 21 as the leading RTP sequence number. Video packet existence 24 is video existence information and indicates whether a video packet exists in the RTP packet that has RTP sequence number 21.

Video packet continuity 25 is video continuity information and indicates whether video packets in RTP packets that have RTP sequence number 21 are continuous. When "present," video packet continuity 25 indicates that video packets are continuous, and when "absent," indicates that video packets are not continuous.

Video packet importance 26 indicates whether video packets in the RTP packet that has RTP sequence number 21 are important. When "present," video packet importance 26 indicates that a video packet is important, and when "absent," indicates that the video packet is not important.

Returning to FIG. 7, based on error information table S6 that places FEC existence information in correspondence and on FEC packet information S5, image information table generation unit 6 determines for each RTP sequence number whether the RTP packet of that RTP sequence number is a correctable packet for which error correction is possible by means of FEC data or whether an uncorrectable packet for which error correction by FEC data is not possible.

More specifically, image information table generation unit 6 first, based on an RTP sequence number that was placed in correspondence with FEC existence information that indicates "present" in error information table S6 and the effective length in the FEC header that is contained in FEC packet information that has that RTP sequence number as the leading RTP sequence number, identifies for each FEC packet the RTP sequence number of the RTP packet that is the object of error correction by means of the FEC packet.

Image information table generation unit 6 next, for each FEC packet, determines whether FEC existence information that indicates "present" has been placed in correspondence with any of the RTP sequence numbers that were identified.

When FEC existence information that indicates "present" has been placed in correspondence and when there are two or more items of RTP existence information that indicate "absent" among the RTP existence information that was placed in correspondence with the RTP sequence number that was identified, image information table generation unit 6 determines that the RTP packet of that RTP sequence number is an uncorrectable packet. On the other hand, when there is no more than one item of RTP existence information that indicates "absent" among the RTP existence information, image information table generation unit 6 determines that the RTP packet of that RTP sequence number is a correctable packet.

On the other hand, when FEC existence information that indicates "present" has not been placed in correspondence and when there are one or more items of RTP existence information that indicate "absent" among the RTP existence information that was placed in correspondence with the RTP sequence number that was identified, image information table generation unit 6 determines that the RTP packet of the RTP sequence number is an uncorrectable packet. On the other hand, when there are no items of RTP existence information that indicate "absent" among the RTP existence information, image information table generation unit 6 determines that the RTP packet of the RTP sequence number is a correctable packet.

Upon determining whether an RTP packet is a correctable packet or an uncorrectable packet, image information table generation unit 6 places the determination result in correspondence with the RTP sequence number of the RTP packet in error information table S6. Upon completing Step S109, image information table generation unit 6 executes Step S110.

In Step S110, image information table generation unit 6 generates image information table S8 based on error information table S6 and TS header information S7.

Image information table S8 places in correspondence for each video frame number that identifies a picture: packet loss existence information that indicates whether there is a loss in video packets that have the picture, recovery information that indicates whether error correction is possible for the video packets, the picture type of the picture, the code amount of the picture, and the average code amount that is the average value of code amounts.

More specifically, image information table generation unit 6 first checks RTP sequence numbers that are placed in correspondence with RTP existence information that indicates "present" in error information table S6. Image information table generation unit 6 acquires from TS header information S7 picture information that corresponds to the RTP sequence numbers that were checked.

Image information table generation unit 6 next generates, for each video frame number in the picture information that was acquired, video existence information that was placed in correspondence with these video frame numbers as packet loss existence information that corresponds to these video frame numbers.

Image information table generation unit 6 further generates, for each of these video frame numbers, the average value of the code amounts that correspond to a plurality of video frame numbers (at least 30 video frame numbers) that precede these video frame numbers as the average code amount that corresponds to these video frame numbers.

Finally, for each of these video frame numbers, image information table generation unit 6 checks the degrees of importance of the pictures that were placed in correspondence with the video frame numbers, and when the degree of importance indicates "important," determines that the picture type that corresponds to that video frame number is an I-picture. For each video frame number, image information table generation unit 6 subtracts the code amount that corresponds to that video frame number from the average code amount that corresponds to that video frame number to find the transition of code amount. Image information table generation unit 6 carries out pattern matching between the transition of code amount that was found and transitions of code amount that accord with picture types that are held in advance to estimate picture types other than I-pictures that correspond to the video frame numbers. Methods of estimating picture type based on the transition of code amount are known and described in, for example, Non-Patent Document 1 (IEICE Technical Report, CQ 2007-74)

Image information table generation unit 6 then generates, as recovery information that corresponds to each of the video frame numbers that were acquired, the determination results of whether RTP packets that corresponds to the RTP sequence numbers that were checked are correctable packets or uncorrectable packets.

Image information table S8 that relates to RTP packets that are not missing is generated by means of the above-described process. Image information table S8 that relates to missing RTP packets is generated from image information table S8 that relates to RTP packets that are not missing.

More specifically, image information table generation unit 6 first checks the RTP sequence numbers that were placed in correspondence with RTP existence information that indicates "absent" in error information table S6.

Image information table generation unit 6 next finds the number of these RTP sequence numbers as the number of missing RTP packets. Image information table generation unit 6 further estimates the number of missing pictures based on this number of RTP packets that are missing and the transitions of code amounts that correspond to RTP sequence numbers before the RTP sequence numbers that were placed in correspondence with the RTP existence information that indicates "absent."

Image information table generation unit 6 further estimates the picture type of missing pictures based on the transitions of picture types and transitions of code amounts that correspond to the RTP sequence numbers that precede the RTP sequence numbers that were placed in correspondence with the RTP existence information that indicates "absent."

Image information table generation unit 6 then, based on the picture types and transitions of code amounts that correspond to the RTP sequence numbers preceding the RTP sequence numbers that were placed in correspondence with the RTP existence information that indicates "absent," generates recovery information that corresponds to each of the video frame numbers that correspond to the RTP sequence numbers that were placed in correspondence with RTP existence information that indicates "absent."

Image information table S8 that relates to missing RTP packets is thus generated.

Figure 9:
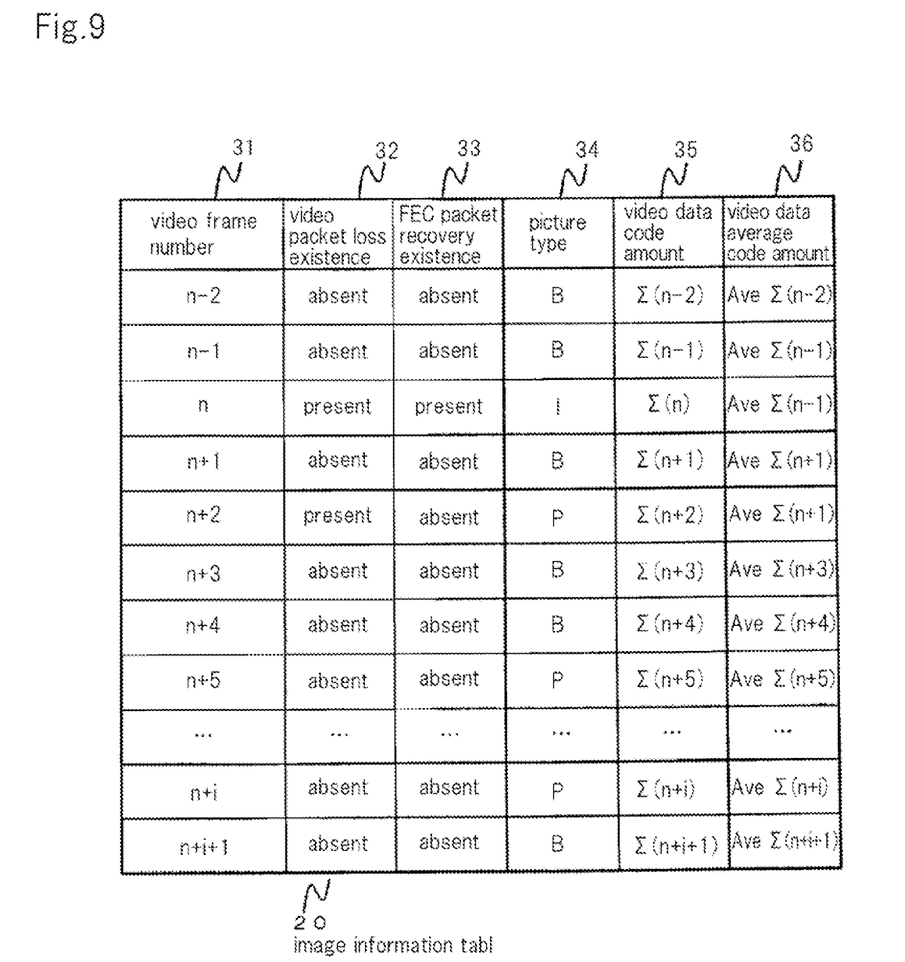
FIG. 9 is an explanatory view showing an example of an image information table.

FIG. 9 is an explanatory view showing an example of image information table S8. In FIG. 9, image information table 30 includes: video frame number 31, video packet loss existence 32, FEC packet recovery existence 33, picture type 34, video data code amount 35, and video data average code amount 36.

Video packet loss existence 32 is packet loss existence information and indicates whether loss of video packets that have pictures of video frame number 31 has occurred. FEC packet recovery existence 33 is recovery information and indicates whether error correction is possible for video packets having pictures of video frame number 31. Picture type 34 is the picture type of a picture of video frame number 31 and indicates any of I-picture, B-picture, and P-picture. Video data code amount 35 is the code amount of pictures of video frame number 31, and video data average code amount 36 is the average value of video data code amount 35.

Returning to FIG. 7, image information table generation unit 6 supplies image information table S8 that was generated to image quality estimation unit 7. Image quality estimation unit 7 executes Step S111 upon the input of image information table S8.

In Step S111, image quality estimation unit 7 identifies video frame numbers in image information table S8 for which the RTP existence information indicates "absent" and the FEC existence information indicates "absent." Pictures that correspond to these video frame numbers that are identified are uncorrectable pictures included in RTP packets that are missing and for which error correction by FEC data is not possible.

Image quality estimation unit 7 finds the number of video frames that have been identified as the number of uncorrectable pictures and finds the picture types that correspond to each of these video frames that have been identified as the picture types of uncorrectable pictures.

When an uncorrectable picture is an I-picture, the video stream cannot be returned to normal data until the next I-picture appears, resulting in a severe deterioration of image quality. When the uncorrectable picture is a B-picture or a P-picture, the video stream suffers deterioration in quality within that frame and there is consequently little adverse impact upon image quality.

As a result, image quality estimation unit 7 sets image quality S9 to the minimum level when the picture for which error correction is not possible is an I-picture, sets image quality S9 to an intermediate level that is better than the minimum level when the picture for which error correction is not possible is a P-picture, sets image quality S9 to a high level that is superior to the intermediate level when the picture for which error correction is not possible is a B-picture, and sets image quality S9 to the highest level that is superior to the high level when there is no picture for which error correction is not possible.

When there is a plurality of pictures for which error correction is not possible, image quality estimation unit 7 carries out weighting of image quality according to the picture type of the picture for which error correction is not possible. The sum of the image quality for which this weighting has been implemented may be generated as image quality S9.

The method of estimating image quality realized by image quality estimation unit 7 may be, for example, the method used in Patent Document 1 or Non-Patent Document 1.

The effect of the invention is next described.

FEC packet analysis unit 3 verifies the continuity of FEC packets. Error information table generation unit 4 verifies the continuity of image packets. The estimation unit, based on these continuities, estimates the image data contained in the image packets that are missing and for which error correction by FEC data is not possible as uncorrectable data. The estimation unit estimates the image quality of the image data based on the uncorrectable data.

In this case, uncorrectable data are estimated based on the continuity of FEC packets and the continuity of image packets. In addition, the image quality of image data is estimated based on the uncorrectable data.

Accordingly, the need for carrying out error correction in order to estimate image quality is eliminated, whereby TS packets need not be delayed and the need for a large-capacity memory is circumvented.

In the present exemplary embodiment, the estimation unit analyzes the TS headers of image packets to estimate the picture types of uncorrectable data and estimates the image quality based on the picture types that are estimated.

When error correction of a picture is not possible, the time until error correction is possible differs according to the picture type of the picture, and the image quality therefore varies according to the picture types for which error correction is not possible. Accordingly, in the present exemplary embodiment, image quality is estimated based on the picture type to enable accurate estimation of image quality.

In the present exemplary embodiment, the estimation unit analyzes TS headers of image packets to find the code amount of image data that are contained in image packets, and the picture types of uncorrectable pictures are estimated based on the code amount.

Normally, the code amount of a picture varies for each normal picture type and the picture type can therefore be estimated according to the code amount of the picture. As a result, picture types can be estimated accurately.

The functions of the image quality estimation apparatus as described hereinabove may be realized by recording a program for realizing these functions on a recording medium that can be read to a computer and then by causing a computer to read and execute the program that is recorded on the recording medium.

In addition, the recording medium that records a program for realizing the functions of the image quality estimation apparatus and that can be read to a computer is an exemplary embodiment of the present invention.

Although the invention of the present application has been described with reference to an exemplary embodiment, the invention of the present application is not limited to the above-described exemplary embodiment. The constitution and details of the invention of the present application are open to various modifications within the scope of the invention of the present application that will be clear to one of ordinary skill in the art.

What is claimed is:

1. An image quality estimation apparatus comprising:
    an input unit that receives image packets in which image data have been converted to packets and correction packets in which correction data for correcting errors of said image data are converted to packets;
    a first verification unit that verifies the continuity of image packets received by said input unit;
    a second verification unit that verifies the continuity of correction packets received by said input unit; and
    an estimation unit that, based on each of the continuities that were verified in said first verification unit and said second verification unit, estimates, as uncorrectable data, image data that are contained in missing image packets and for which error correction by said correction data is not possible and estimates image quality of said image data based on the uncorrectable data that was estimated.

2. The image quality estimation apparatus as set forth in claim 1, wherein said estimation unit analyzes header information of image packets that are received by said input unit to estimate picture types of said uncorrectable data, and estimates said image quality based on the picture types.

3. The image quality estimation apparatus as set forth in claim 2, wherein said estimation unit analyzes said header information to find code amounts of image data that are included in image packets that are received by said input unit, and based on the code amounts, estimates picture types of said uncorrectable data.

4. An image quality estimation method that is realized by an image quality estimation apparatus, comprising:
    receiving image packets in which image data are converted to packets and correction packets in which correction data for correcting errors of said image data are converted to packets;
    verifying the continuity of said image packets that are received;
    verifying the continuity of said correction packets that are received; and
    based on each of the continuities that were verified, estimating, as uncorrectable data, image data that are contained in missing image packets and for which correction by said correction data is not possible, and estimating image quality of said image data based on the uncorrectable data that were estimated.

5. The image quality estimation method as set forth in claim 4, wherein said estimating includes analyzing header information of said image packets that were received to estimate picture types of said uncorrectable data, and estimating said image quality based on the picture types.

6. The image quality estimation method as set forth in claim 5, wherein said estimating includes analyzing said header information to find code amounts of image data that are contained in said image packets that were received, and estimating picture types of said uncorrectable data based on the code amounts.

7. A non-transitory computer-readable medium encoded with a computer program, which when executed by a computer, causes the computer to:
    receive image packets in which image data are converted to packets and correction packets in which correction data for correcting errors of said image data are converted to packets;
    verify the continuity of said image packets that were received;
    verify the continuity of said correction packets that were received; and
    based on each of the continuities that were verified, estimate as uncorrectable data, image data that are contained in image packets that are missing and for which error correction by said correction data is not possible, and estimate image quality of said image data based on the uncorrectable data that were estimated.

* * * * *